US008494392B2

(12) United States Patent
Kasahara

(10) Patent No.: US 8,494,392 B2
(45) Date of Patent: Jul. 23, 2013

(54) IMAGE FORMING APPARATUS AND IMAGE FORMING SYSTEM

(75) Inventor: Shigeru Kasahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/966,780

(22) Filed: Dec. 13, 2010

(65) Prior Publication Data

US 2011/0150520 A1 Jun. 23, 2011

(30) Foreign Application Priority Data

Dec. 18, 2009 (JP) ................................ 2009-288469

(51) Int. Cl.
*G03G 21/00* (2006.01)
*G06F 15/00* (2006.01)

(52) U.S. Cl.
USPC ................ 399/76; 399/38; 399/75; 347/262; 358/1.4; 358/1.5; 358/1.9; 358/1.13; 358/1.18

(58) Field of Classification Search
USPC ........ 399/38, 75, 76, 130, 297, 302; 347/262; 358/1.4, 1.5, 1.9, 1.13, 1.18
See application file for complete search history.

(56) References Cited

U.S. PATENT DOCUMENTS 5,857,131 A * 1/1999 Hasegawa ....................... 399/46
6,032,014 A * 2/2000 Janssens et al. .............. 399/270
7,145,690 B1 * 12/2006 Yoshimura ..................... 358/1.9
2003/0048313 A1 * 3/2003 Frodl et al. ...................... 346/44
2004/0234303 A1 11/2004 Shimizubata
2006/0039728 A1 * 2/2006 deJong et al. ................. 399/381
2006/0233569 A1 * 10/2006 Furst et al. ..................... 399/162
2009/0290895 A1 * 11/2009 Young et al. ..................... 399/75
2009/0290896 A1 * 11/2009 Young et al. ..................... 399/75
2010/0296108 A1 * 11/2010 Dobbertin et al. ............. 358/1.5
2010/0296128 A1 * 11/2010 Young et al. .................. 358/409
2010/0296823 A1 * 11/2010 Dobbertin et al. .............. 399/16
2010/0296829 A1 * 11/2010 Young et al. ..................... 399/76
2011/0076045 A1 * 3/2011 Sobue ............................. 399/81
2012/0120420 A1 * 5/2012 Miyazaki ....................... 358/1.9

FOREIGN PATENT DOCUMENTS

JP 6-148992 A 5/1994
JP 2004-268572 A 9/2004
JP 2010284884 A * 12/2010

* cited by examiner

*Primary Examiner* — David Gray
*Assistant Examiner* — Francis Gray
(74) *Attorney, Agent, or Firm* — Canon USA Inc. IP Division

(57) ABSTRACT

An image forming system including first and second image forming apparatuses that includes a first image forming unit configured to form an image on a first surface of recording paper, a discharging unit configured to discharge the recording paper on which the image is formed by the first image forming unit to the second image forming apparatus, a second image forming unit configured to form an image on a second surface of the recording paper discharged by the discharging unit from the first image forming apparatus, and a correction unit configured to correct adjustment timing of the image forming system as a whole so that first adjustment timing for performing an adjustment operation of an output image formed by the first image forming unit and second adjustment timing for performing an adjustment operation of an output image formed by the second image forming unit accord with each other.

6 Claims, 7 Drawing Sheets

FIG. 5

| | 1 | 2 | 3 | 4 | 5 | 6 | 7 | 8 | 9 | 10 | 11 | 12 | 13 | 14 | 15 | 16 | 17 | 18 | 19 | 20 | 21 | STOP TIME |
|---|---|---|---|---|---|---|---|---|---|---|---|---|---|---|---|---|---|---|---|---|---|---|
| FIRST IMAGE FORMING APPARATUS | | ▨ | | | ▨ | | | ▨ | | | | ▨ | | | | ▨ | | | ▨ | | | 6 |
| SECOND IMAGE FORMING APPARATUS | | | ▨ | | | | ▨ | | | | | ▨ | | | | | ▨ | | | | ▨ | 5 |
| WHOLE SYSTEM | | ▨ | | | ▨ | | | ▨ | | | | ▨ | | | | ▨ | | | ▨ | | | 6 |

▨ ... TIMING TO PERFORM ADJUSTMENT OPERATION

FIG. 7

| | 1 | 2 | 3 | 4 | 5 | 6 | 7 | 8 | 9 | 10 | 11 | 12 | 13 | 14 | 15 | 16 | 17 | 18 | 19 | 20 | 21 | STOP TIME |
|---|---|---|---|---|---|---|---|---|---|---|---|---|---|---|---|---|---|---|---|---|---|---|
| FIRST IMAGE FORMING APPARATUS | | ▨ | | | ▨ | | | ▨ | | | | ▨ | | | | ▨ | | | ▨ | | | 6 |
| SECOND IMAGE FORMING APPARATUS | | | ▨ | | | | ▨ | | | | | ▨ | | | | | ▨ | | | | ▨ | 5 |
| WHOLE SYSTEM | | ▨ | ▨ | | ▨ | | ▨ | ▨ | | | | ▨ | | | | ▨ | ▨ | | ▨ | | ▨ | 10 |

▨ TIMING TO PERFORM ADJUSTMENT OPERATION

IMAGE FORMING APPARATUS AND IMAGE FORMING SYSTEM

BACKGROUND OF THE INVENTION

1. Field of the Invention

The present invention relates to an image forming apparatus, such as a copying machine or printer, that can perform an adjustment operation, and an image forming system including a plurality of such image forming apparatuses connected to each other.

2. Description of the Related Art

As a conventional image forming system, a system in which a first image forming apparatus that forms an image on a front side of recording paper and a second image forming apparatus that forms an image on a back side of the recording paper are connected to each other to form images on both sides of the recording paper is known (see, for example, Japanese Patent Application Laid-Open No. 2004-268572).

More specifically, recording paper having an image formed on the front side thereof by the first image forming apparatus is reversed and conveyed to the second image forming apparatus before an image is formed on the back side of the recording paper by the second image forming apparatus.

Some image forming apparatuses perform an adjustment operation such as a gradation correction to stabilize image quality of images output to recording paper. For example, some image forming apparatuses form a pattern image for gradation correction on an intermediate transfer belt to make gradation corrections based on data obtained by reading the pattern image (see, for example, Japanese Patent Application Laid-Open No. 6-148992).

However, if an adjustment operation according to Japanese Patent Application Laid-Open No. 6-148992 should be performed in an image forming apparatus according to Japanese Patent Application Laid-Open No. 2004-268572, it is necessary to perform the adjustment operation at each of adjustment timing of the first image forming apparatus and that of the second image forming apparatus.

An example in which, as illustrated in a specific example of FIG. 7, among 21 periods in all, the adjustment timing is set six times for the first image forming apparatus and five times for the second image forming apparatus will be shown. In this case, if one of the image forming apparatuses performs an adjustment operation, an operation as an image forming system cannot be performed when the image forming system is considered as a whole. Thus, the image forming system stops an image forming operation, causing 10 stop periods in the system as a whole.

Thus, in a conventional image forming system in which a plurality of image forming apparatuses is connected, an image forming operation in the system as a whole is stopped at adjustment timing of each image forming apparatus. Thus, along downtime occurs in the conventional image forming system, resulting in lower productivity.

SUMMARY OF THE INVENTION

The present invention is directed to reduction of occurrences of downtime and prevention of lowering of productivity as a whole system when an adjustment operation is performed in an image forming system in which a plurality of image forming apparatuses is connected.

According to an aspect of the present invention, an image forming system including a first image forming apparatus and a second image forming apparatus includes a first image forming unit mounted in the first image forming apparatus and configured to form an image on a first surface of recording paper, a discharging unit mounted in the first image forming apparatus and configured to discharge the recording paper on which the image is formed by the first image forming unit to the second image forming apparatus, a second image forming unit mounted in the second image forming apparatus and configured to form an image on a second surface of the recording paper discharged by the discharging unit from the first image forming apparatus, a first adjustment unit mounted in the first image forming apparatus and configured to perform adjustment operation to adjust the image formed by the first image forming unit at a first adjustment timing, a second adjustment unit mounted in the second image forming apparatus and configured to perform adjustment operation to adjust the image formed by the second image forming unit at a second adjustment timing, and a correction unit configured to correct the first adjustment timing and the second adjustment timing to accord with each other.

According to another aspect of the present invention, an image forming apparatus configured to form an image on recording paper in cooperation with a second image forming apparatus includes an image forming unit configured to form an image on a first surface of recording paper, an adjustment unit configured to adjust the image formed by the image forming unit at a first adjustment timing, a receiving unit configured to receive a second adjustment timing of an adjustment performed by the second image forming apparatus from the second image forming apparatus, which is configured to form an image on a second surface of the recording paper, and a correction unit configured to correct the first adjustment timing so that the first adjustment timing of the adjustment performed by the adjustment unit and the second adjustment timing received by the receiving unit accord with each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a diagram illustrating timing for performing an adjustment operation of the image forming system according to an exemplary embodiment of the present invention.

FIG. 7 is a diagram illustrating timing for performing an adjustment operation of a conventional image forming system.

DESCRIPTION OF THE EMBODIMENTS

Various exemplary embodiments, features, and aspects of the invention will be described in detail below with reference to the drawings.

Figure 1:
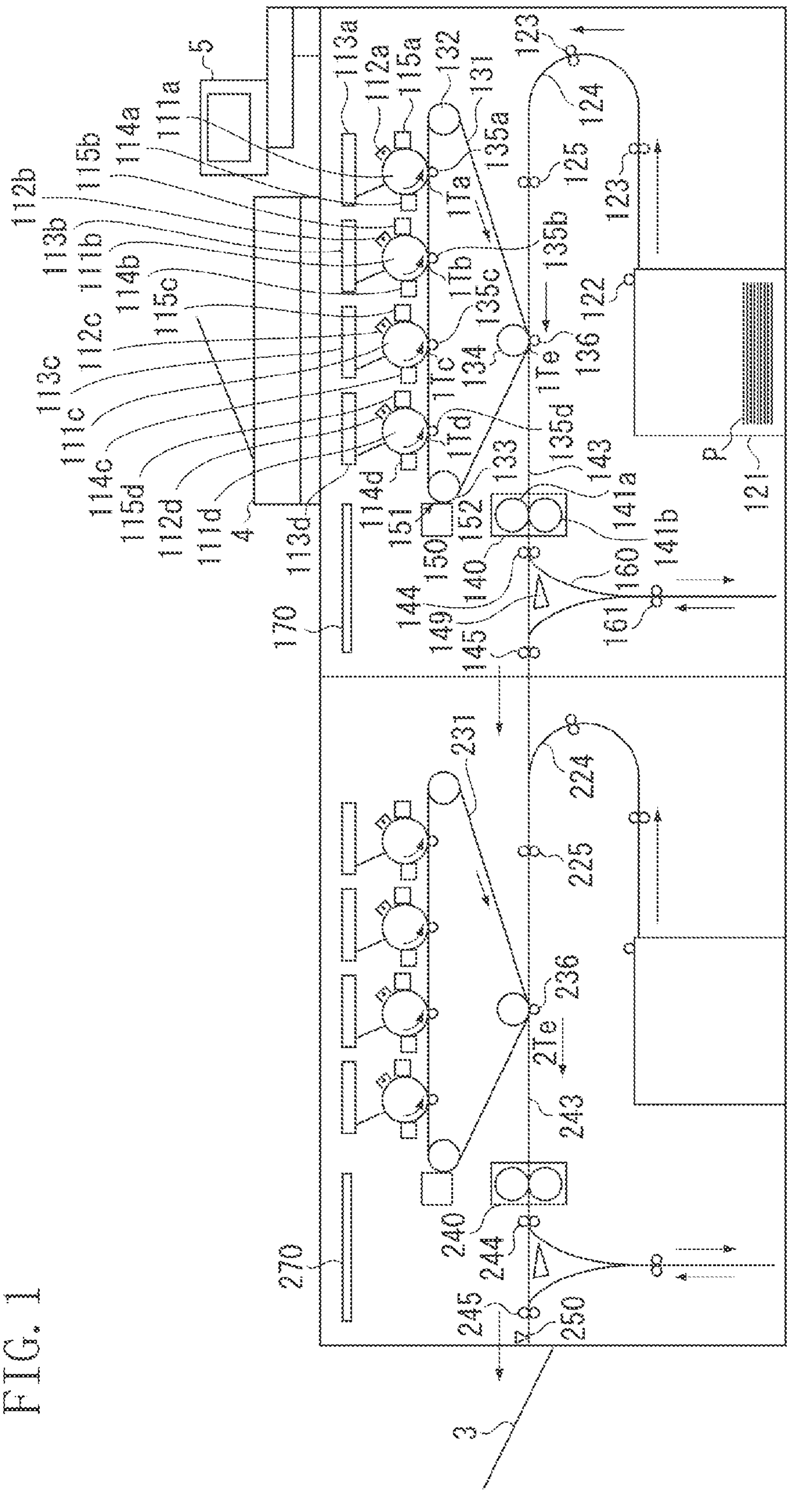
FIG. 1 is a sectional view of an image forming system according to an exemplary embodiment of the present invention.

FIG. 1 is a sectional view of an image forming system according to an exemplary embodiment of the present invention. The image forming system is configured by a first image forming apparatus 11 and a second image forming apparatus 21 being connected to each other. Each of the first image forming apparatus 11 and the second image forming apparatus 21 is a color image forming apparatus in which a plurality of image forming stations is installed adjacent to each other.

An image reading apparatus 4, which reads a document image, and an operation unit 5, which receives an operation input from a user, are mounted on the first image forming apparatus 11. Moreover, a control unit 170, which controls the operation of each mechanism inside the apparatus, is mounted in the first image forming apparatus 11.

Four image forming stations a, b, c, and d are installed adjacent to each other in the first image forming apparatus 11 and each image forming station has a similar configuration. Primary charging devices 112*a* to 112*d*, exposure devices 113*a* to 113*d*, and developing devices 114*a* to 114*d* are arranged opposite the outer circumferential surfaces of photosensitive drums 111*a* to 111*d*, which are driven to rotate in the arrow direction in FIG. 1.

The primary charging devices 112*a* to 112*d* provide charges of a uniform electrification amount to the surfaces of the photosensitive drums 111*a* to 111*d*. The exposure devices 113*a* to 113*d* scan a light beam such as a laser beam modulated according to an image signal by rotating a polygon mirror and form an electrostatic latent image by irradiating the photosensitive drums 111*a* to 111*d* with the light beam. The developing devices 114*a* to 114*d* houses developers (toner) of four colors of yellow (Y), magenta (M), cyan (C), and black (Bk), respectively, to develop each electrostatic latent image on the photosensitive drums 111*a* to 111*d* as a toner image.

Cleaning devices 115*a* to 115*d* are mounted downstream of primary transfer areas 1Ta to 1Td, where developed toner images are transferred to an intermediate transfer belt 131. The cleaning devices 115*a* to 115*d* clean the surfaces of the photosensitive drums 111*a* to 111*d* by scraping away toner remaining on the photosensitive drums 111*a* to 111*d*.

The intermediate transfer belt 131 is wound around a driving roller 132 that transmits a driving force, a tension roller 133 that provides a suitable tension to the intermediate transfer belt 131, and a secondary transfer internal roller 134, which is located opposite a secondary transfer area 1Te across the intermediate transfer belt 131. The driving roller 132 is driven to rotate by an intermediate transfer driving motor (not illustrated).

A toner image formed on the photosensitive drum 111*d* most upstream in a rotation direction of the intermediate transfer belt 131 is primarily transferred to the intermediate transfer belt 131 in the primary transfer area 1Td by a primary transfer device 135*d*, to which a high voltage is applied. Then, the toner image primarily transferred onto the intermediate transfer belt 131 is conveyed to the next primary transfer area 1Tc, where the toner image on the photosensitive drum 111*c* is transferred by aligning with the toner image on the intermediate transfer belt 131. Hereinafter, the same process is repeated to primarily transfer toner images of four colors onto the intermediate transfer belt 131.

Recording paper P housed in a cassette 121, on the other hand, is sent out sheet by sheet by a pickup roller 122 and conveyed by a conveyance roller pair 123 along a feeding guide 124. Then, a skew correction of the recording paper P is made by causing the recording paper P to collide with a registration roller 125, whose rotation is stopped. The registration roller 125 then sends out the recording paper P to the secondary transfer area 1Te in accord with the timing of the toner image on the intermediate transfer belt 131. The toner image on the intermediate transfer belt 131 is then transferred onto the recording paper P in the secondary transfer area 1Te by a secondary transfer device 136, to which a high voltage is applied. In this manner, a toner image is transferred onto the front side (first surface) of the recording paper P.

A cleaning device 150, which cleans an image forming surface of the intermediate transfer belt 131, is arranged downstream of the secondary transfer area 1Te in the rotation direction of the intermediate transfer belt 131. The cleaning device 150 includes a cleaner blade 151 and a waste toner box 152, which houses waste toner.

The recording paper P that has passed through the secondary transfer area 1Te is guided to a fixing unit 140 by a conveyance guide 143. The fixing unit 140 includes a fixing roller 141*a* equipped with a heat source such as a halogen heater internally and a pressure roller 141*b* (this pressure roller may also be equipped with a heat source) pressed by the fixing roller 141*a*. The toner image on the recording paper P is fixed onto the recording paper P by heat and pressure from the fixing unit 140.

After being sent out by an internal discharging roller 144, the recording paper P conveyed from the fixing unit 140 is guided to a reverse conveying path 160 by a switching member 149 before being conveyed by an inverting roller 161. Then, the inverting roller 161 rotates in the opposite direction and the recording paper P is conveyed from the first image forming apparatus 11 to the second image forming apparatus 21 by an external discharging roller 145 while the recording paper P is reversed.

The recording paper P conveyed to the second image forming apparatus 21 passes through a conveyance guide 224 before being conveyed up to a registration roller 225. A skew correction of the recording paper P is made by causing the recording paper P to collide with a registration roller 225, whose rotation is stopped. An intermediate transfer roller 231 has a toner image formed thereon through a process similar to that of the first image forming apparatus 11. The registration roller 225 then sends out the recording paper P to a secondary transfer area 2Te in accord with the timing of the toner image on the intermediate transfer belt 231. The toner image on the intermediate transfer belt 231 is then transferred onto the recording paper P in the secondary transfer area 2Te by a secondary transfer device 236, to which a high voltage is applied. In this manner, a toner image is transferred onto the back side (second surface) of the recording paper P.

The recording paper P that has passed through the secondary transfer area 2Te is guided to a fixing unit 240 by a conveyance guide 243. The fixing unit 240 is configured similarly to the fixing unit 140 described above and performs a fixing operation by adding heat and pressure to the toner image on the recording paper P. The recording paper P conveyed from the fixing unit 240 is sent out to an internal discharging roller 244 before being discharged to a delivery tray 3 by an external discharging roller 245. A sensor 250, which detects delivery of the recording paper P, is mounted downstream of the external discharging roller 245. With the above procedure, images are formed on both sides of the recording paper P.

Figure 2:
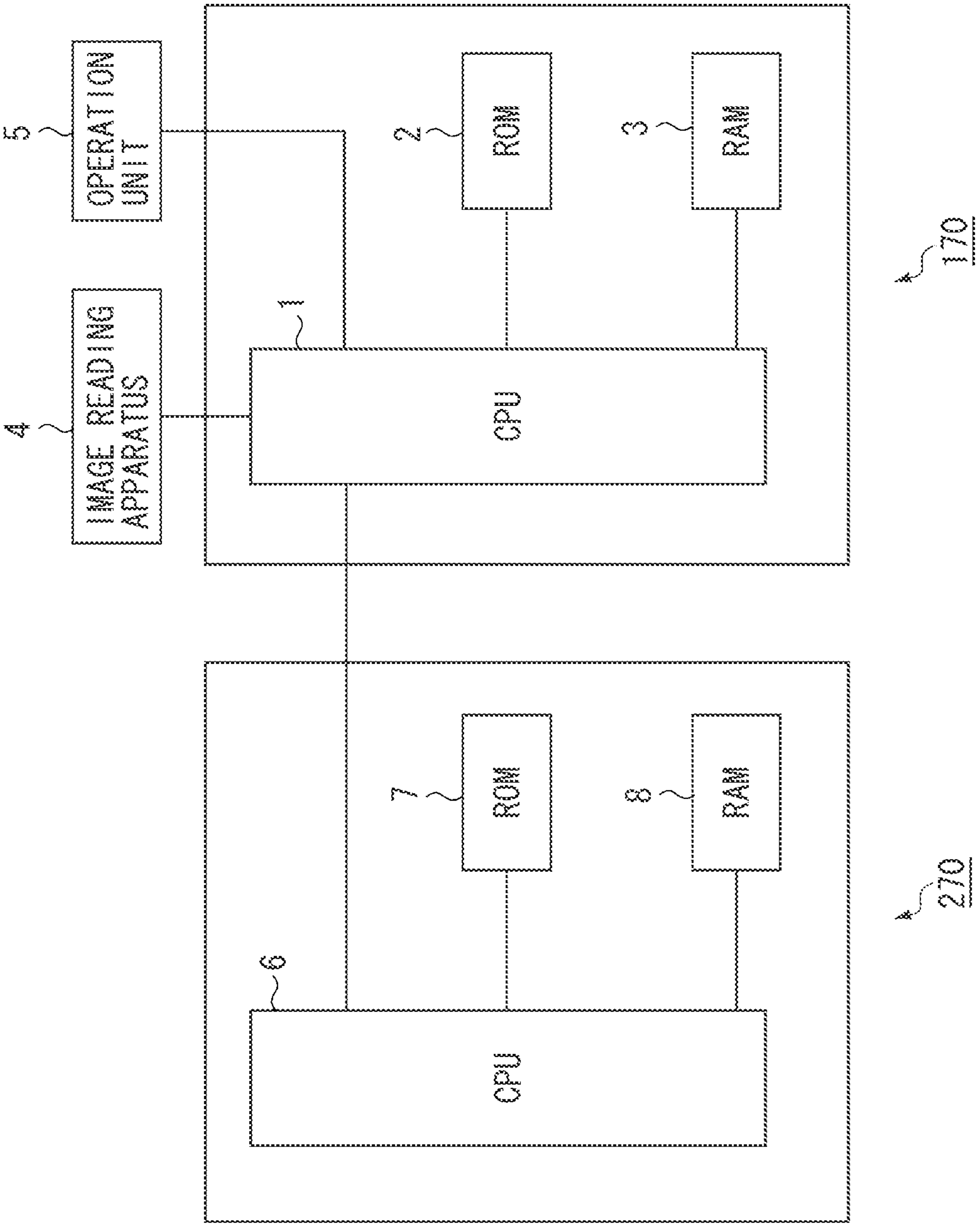
FIG. 2 is a block diagram of the image forming system.

FIG. 2 is a block diagram of the image forming system. A CPU 1 is a control circuit provided in the control unit 170 to control the whole first image forming apparatus 11. A read-only memory (ROM) 2 has a control program to control various kinds of processing performed by the first image forming apparatus 11 housed therein. A random access memory (RAM) 3 is a system work memory for the CPU 1 to operate and also functions as an image memory to temporarily store image data. The image reading apparatus 4, the operation unit 5, and a CPU 6 are also connected to the CPU 1.

The CPU 6 is a control circuit provided in a control unit 270 to control the whole second image forming apparatus 21. A ROM 7 has a control program to control various kinds of processing performed by the second image forming apparatus 21 housed therein. A RAM 8 is a system work memory for the CPU 6 to operate and also functions as an image memory to temporarily store image data. The user can use an input key on the operation unit 5 to issue instructions of switching of an image forming operation mode or switching of the display of the operation unit 5 to the CPU 1.

The CPU 1 and the CPU 6 each perform an adjustment operation to stabilize image quality of output images output to recording paper in each image forming apparatus. An example of various adjustments made by the first image forming apparatus 11 and the second image forming apparatus 21 will be described below.

In the first image forming apparatus 11 and the second image forming apparatus 21, image quality of images output to recording paper fluctuates due to property changes of members accompanying changes of the environment such as the temperature and humidity inside the apparatus or aged deterioration. Thus, the first image forming apparatus 11 and the second image forming apparatus 21 perform an adjustment operation at predetermined timing to stabilize image quality of images output to recording paper.

As an example of the adjustment operation, the first image forming apparatus 11 and the second image forming apparatus 21 make a gradation correction. More specifically, the first image forming apparatus 11 and the second image forming apparatus 21 form a pattern image for gradation correction on an image bearing member, such as a photosensitive drum or intermediate transfer belt, to make a gradation correction based on data obtained by reading the pattern image. In addition, the first image forming apparatus 11 and the second image forming apparatus 21 also perform an adjustment operation to clean a wire of a charging device by moving a cleaner member periodically because electrifying characteristics are degraded if dirt or electrification products adhere to a charging wire of a primary charging device.

These adjustment operations are processing necessary to maintain high image quality, and quality degradation of images output to recording paper due to changes of gradation characteristics or dirt of the charging wire can be prevented by frequently making such adjustments.

Figure 3:
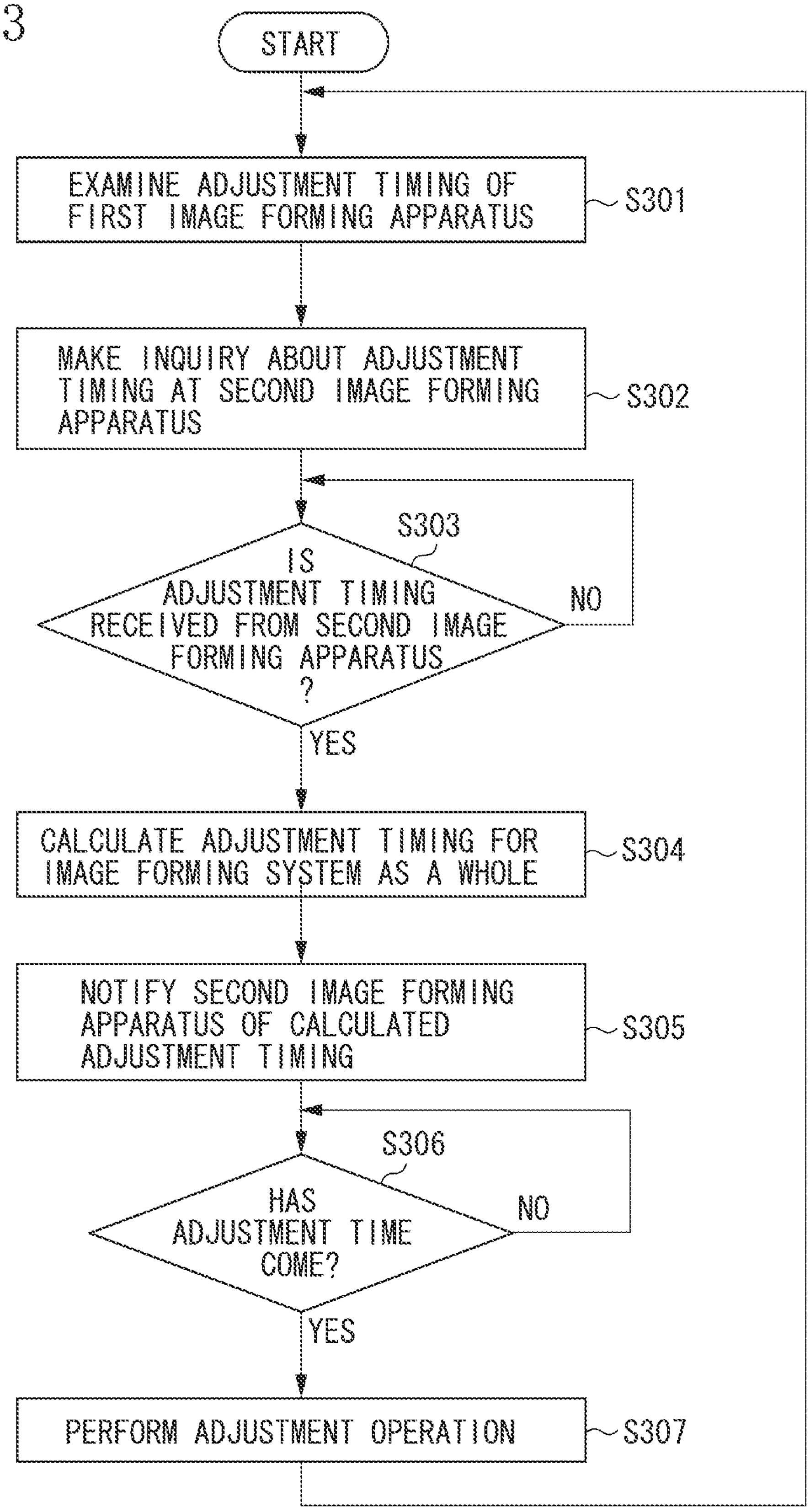
FIG. 3 is a flow chart illustrating an operation of a first image forming apparatus performed by a first central processing unit (CPU).

FIG. 3 is a flow chart illustrating an operation of the first image forming apparatus 11 performed by the CPU 1. A program to execute the flow chart is stored in the ROM 2 and executed by being read by the CPU 1.

First, in step S301, the CPU 1 examines adjustment timing of the first image forming apparatus 11. The adjustment timing is individually set depending on the type of adjustment thereof. Then, in step S302, the CPU 1 makes an inquiry about the adjustment timing of the second image forming apparatus 21 at the second image forming apparatus 21 and, in step S303, waits until the adjustment timing is received.

Next, in step S304, the CPU 1 calculates the adjustment timing of the image forming system as a whole based on the adjustment timing of the first image forming apparatus 11 and the adjustment timing of the second image forming apparatus 21. How to calculate the adjustment timing of the image forming system as a whole will be described below in detail.

Then, in step S305, the CPU 1 notifies the second image forming apparatus 21 of the calculated adjustment timing of the image forming system as a whole. Subsequently, in step S306, the CPU 1 determines whether the calculated adjustment timing of the image forming system as a whole has come. If the CPU 1 determines that the adjustment timing of the image forming system as a whole has come (YES in step S306), then in step S307, the CPU 1 performs an adjustment operation in the first image forming apparatus 11. When the adjustment operation is completed, the processing returns to step S301.

Figure 4:
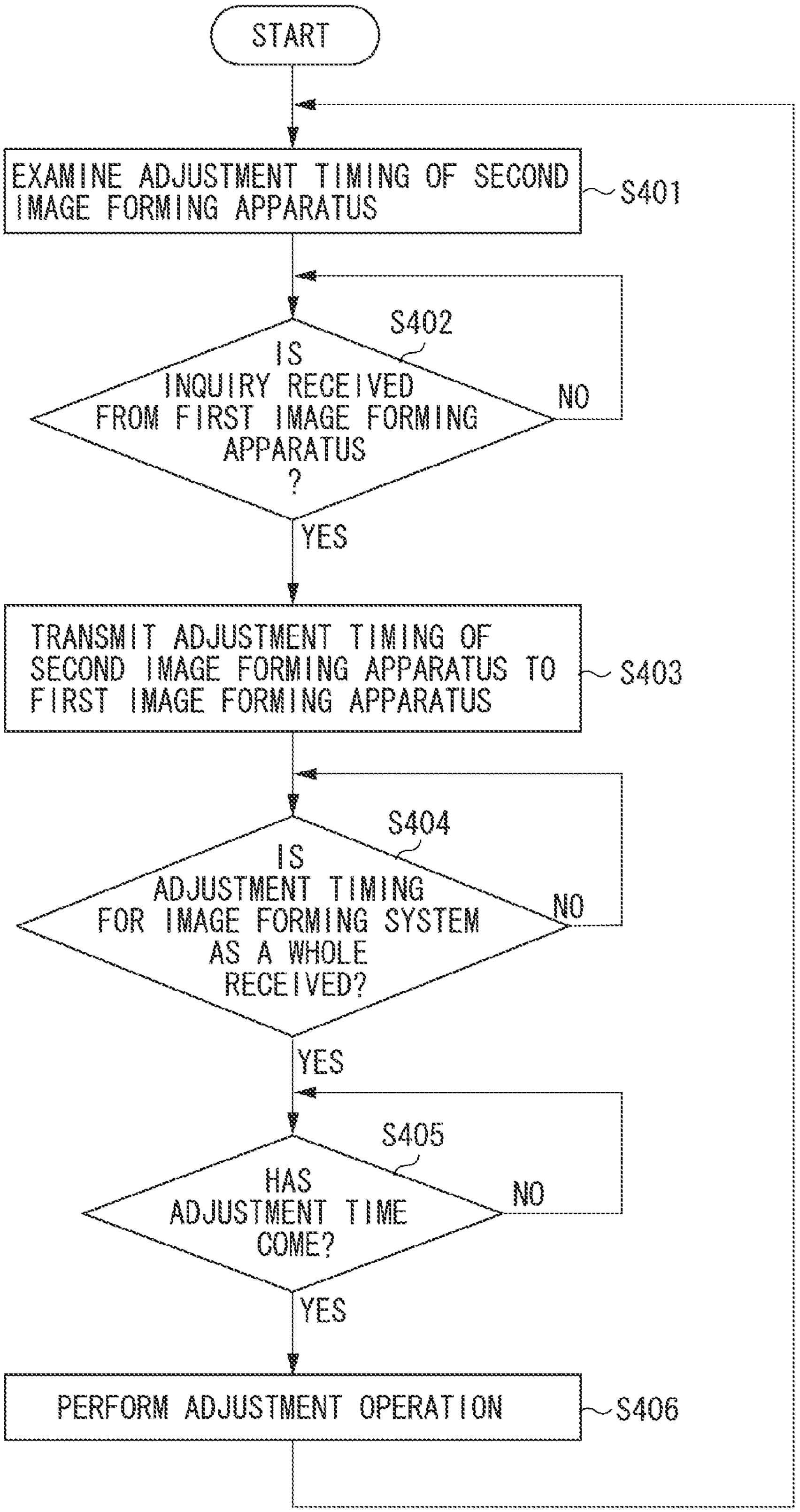
FIG. 4 is a flow chart illustrating an operation of a second image forming apparatus performed by a second CPU.

FIG. 4 is a flow chart illustrating an operation of the second image forming apparatus 21 performed by the CPU 6. A program to execute the flow chart is stored in the ROM 7 and executed by being read by the CPU 6.

First, in step S401, the CPU 6 examines adjustment timing of the second image forming apparatus 21. Then, in step S402, the CPU 6 waits until an inquiry about the adjustment timing transmitted from the first image forming apparatus 11 in step S302 in FIG. 3 is received. After the inquiry about the adjustment timing being received from the first image forming apparatus 11, then in step S403, the CPU 6 transmits the adjustment timing of the second image forming apparatus 21 to the first image forming apparatus 11.

Next, in step S404, the CPU 6 waits until the adjustment timing of the image forming system as a whole notified from the first image forming apparatus 11 in step S305 in FIG. 3 is received. After the adjustment timing of the image forming system as a whole being received, then in step S405, the CPU 6 determines whether the calculated adjustment timing of the image forming system as a whole has come. If the CPU 6 determines that the adjustment timing of the image forming system as a whole has come (YES in step S405), then in step S406, the CPU 6 performs an adjustment operation in the second image forming apparatus 21. When the adjustment operation is completed, the processing returns to step S401.

FIG. 5 is a diagram illustrating timing for performing an adjustment operation of the image forming system according to the present embodiment.

Among 21 periods in all, the adjustment timing is set six times for the first image forming apparatus and five times for the second image forming apparatus. The adjustment timing of each time comes according to circumstances of each image forming apparatus and thus comes at different times for the first image forming apparatus 11 and the second image forming apparatus 21.

If the adjustment timing for the second image forming apparatus 21 comes within a predetermined period from the adjustment timing for the first image forming apparatus 11, the adjustment timing is corrected so that the adjustment timing for the first image forming apparatus 11 and that for the second image forming apparatus 21 accord with each other.

In the example in FIG. 5, if the difference between the adjustment timing for the first image forming apparatus 11 and the adjustment timing for the second image forming apparatus 21 is within one period, the adjustment timing is corrected so that the first image forming apparatus 11 and the second image forming apparatus 21 start an adjustment operation simultaneously.

While, as illustrated in FIG. 7, there are 10 stop periods as an image forming system as a whole in a conventional image forming system, there are only six stop periods in an image forming system to which the present invention is applied so that occurrences of downtime as a whole system can be reduced.

According to the present exemplary embodiment, as described above, occurrences of downtime as a whole system can be reduced when an adjustment operation is performed so that lowering of productivity can be prevented.

Figure 6:
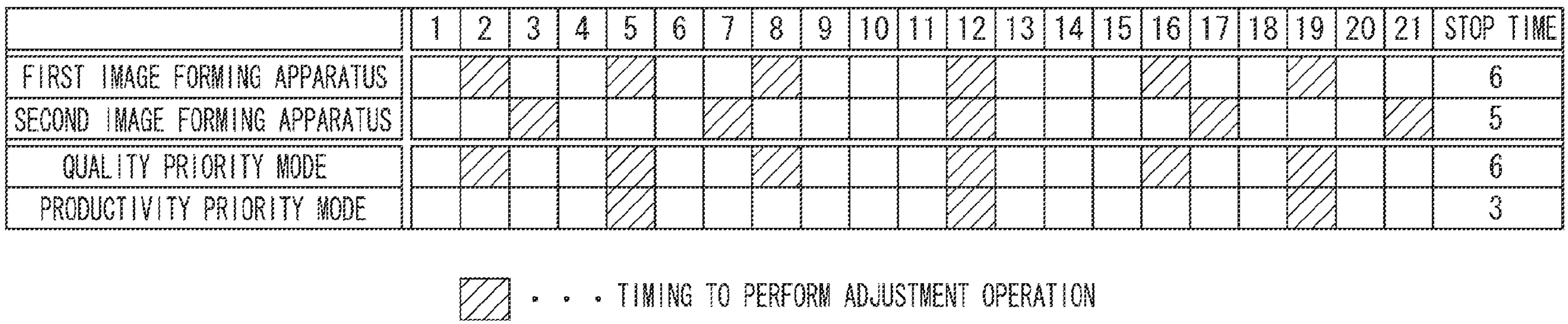
FIG. 6 is a diagram illustrating timing for performing an adjustment operation of the image forming system according to another exemplary embodiment of the present invention.

FIG. 6 is a diagram illustrating timing for performing an adjustment operation of the image forming system according to another exemplary embodiment of the present invention.

In the present exemplary embodiment, the user can select one of a "quality priority mode" as a first mode and a "productivity priority mode" as a second mode via the operation unit 5. When the "quality priority mode" is selected, the adjustment timing is corrected just like in FIG. 5 and when the "productivity priority mode" is selected, the frequency with which an adjustment operation is performed is further reduced by making a correction of further thinning out the adjustment timing.

As illustrated in FIG. 6, while there are six stop periods of the image forming system in "quality priority mode", only one adjustment operation is performed for two times of adjustment timing in "productivity priority mode". Accordingly, the number of stop periods of the image forming system can be reduced to three.

According to the present exemplary embodiment, the user is allowed to make a selection between high image quality and productivity and if the user selects the "productivity priority mode", a further reduction of downtime can be realized.

While communication is controlled in the above description by assuming that the first image forming apparatus 11 is a master and the second image forming apparatus 21 is a slave, the relationship of the master and slave may be reversed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288469 filed Dec. 18, 2009, which is hereby incorporated by reference herein in its entirety.

What is claimed is:

1. An image forming system including a first image forming apparatus and a second image forming apparatus, the image forming system comprising:

a first image forming unit mounted in the first image forming apparatus and configured to form an image on a first surface of recording paper;

a discharging unit mounted in the first image forming apparatus and configured to discharge the recording paper on which the image is formed by the first image forming unit to the second image forming apparatus;

a second image forming unit mounted in the second image forming apparatus and configured to form an image on a second surface of the recording paper discharged by the discharging unit from the first image forming apparatus;

a first adjustment unit mounted in the first image forming apparatus and configured to perform adjustment operation to adjust the image formed by the first image forming unit at a first adjustment timing;

a second adjustment unit mounted in the second image forming apparatus and configured to perform adjustment operation to adjust the image formed by the second image forming unit at a second adjustment timing; and a correction unit configured to correct the first adjustment timing and the second adjustment timing to accord with each other.

2. The image forming system according to claim 1, further comprising a selection unit configured to allow a user to select one of a first mode that prioritizes image quality and a second mode that prioritizes productivity, wherein if the second mode is selected by the selection unit, the correction unit is configured to reduce a frequency with which the adjustment operations are performed compared with a case where the first mode is selected.

3. The image forming system according to claim 1, wherein if a difference between the first adjustment timing and the second adjustment timing is within a predetermined period, the correction unit is configured to correct the adjustment timing of the image forming system as a whole so that the first adjustment unit and the second adjustment unit perform the adjustment operations simultaneously.

4. The image forming system according to claim 1, wherein the adjustment operation is a gradation correction of the output image.

5. The image forming system according to claim 1, wherein the adjustment operation is cleaning a wire of a charging device.

6. An image forming apparatus configured to form an image on recording paper in cooperation with a second image forming apparatus, the image forming apparatus comprising:

an image forming unit configured to form an image on a first surface of recording paper;

an adjustment unit configured to adjust the image formed by the image forming unit at a first adjustment timing;

a receiving unit configured to receive a second adjustment timing of an adjustment performed by the second image forming apparatus from the second image forming apparatus, which is configured to form an image on a second surface of the recording paper; and a correction unit configured to correct the first adjustment timing so that the first adjustment timing of the adjustment performed by the adjustment unit and the second adjustment timing received by the receiving unit accord with each other.

* * * * *